(12) United States Patent
Ebenezer

(10) Patent No.: US 6,946,549 B2
(45) Date of Patent: Sep. 20, 2005

(54) FIBRE REACTIVE SCARLET AZO DYES

(75) Inventor: Warren James Ebenezer, Stockport (GB)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 78 days.

(21) Appl. No.: 10/477,074

(22) PCT Filed: May 4, 2002

(86) PCT No.: PCT/EP02/04908

§ 371 (c)(1),
(2), (4) Date: Nov. 6, 2003

(87) PCT Pub. No.: WO02/092697

PCT Pub. Date: Nov. 21, 2002

(65) Prior Publication Data

US 2004/0138435 A1 Jul. 15, 2004

(30) Foreign Application Priority Data

May 11, 2001 (GB) .............................................. 0111573

(51) Int. Cl.[7] .......................... C09B 62/09; D06P 1/382
(52) U.S. Cl. .......................................... 534/634; 8/549
(58) Field of Search .............................. 534/634; 8/549

(56) References Cited

U.S. PATENT DOCUMENTS

| 3,647,778 A | 3/1972 | Francis et al. |
| 5,631,352 A | 5/1997 | Lauk |

FOREIGN PATENT DOCUMENTS

| EP | 0 126 265 | 11/1984 |
| EP | 0 693 538 | 1/1996 |
| WO | WO-99/05224 | 2/1999 |
| WO | WO-00/36025 | 6/2000 |

OTHER PUBLICATIONS

B. Smith et al., "Ink Jet Printing For Textiles", Text.Chem. Color 19(8): pp. 23–29, Aug. 1987.
W.C. Tincher et al., "Analyzing Carpet Samples for Formaldehyde Content", Text.Chem. Color 21(5): pp. 27–29 (May 1989).

*Primary Examiner*—Fiona T. Powers
(74) *Attorney, Agent, or Firm*—Connolly Bove Lodge & Hutz LLP

(57) ABSTRACT

The present invention refers to dyestoffs of the formula I wherein Ar is a group of the formula II or of the formula III, D is a group of the formula IV, or of the formula V wherein the variables are defined as given in claim 1, processes for their preparation and their use for dyeing and printing hydroxy- and/or carboxamido-containing fiber materials.

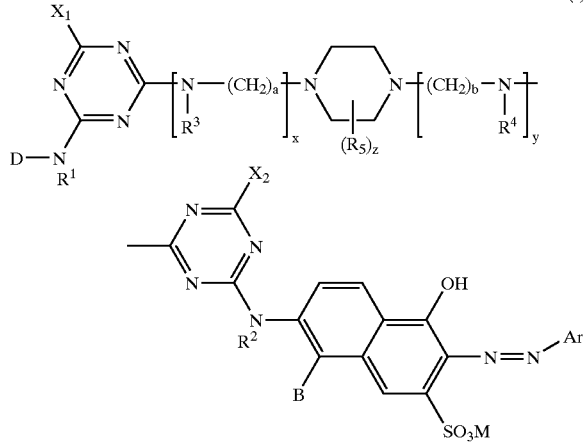

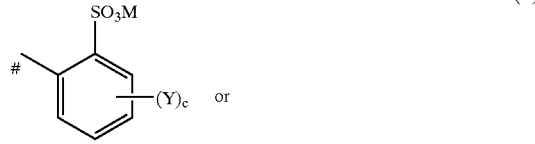

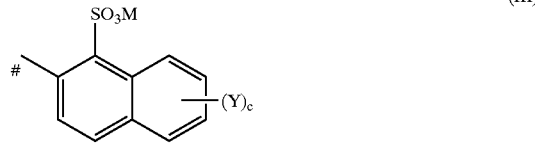

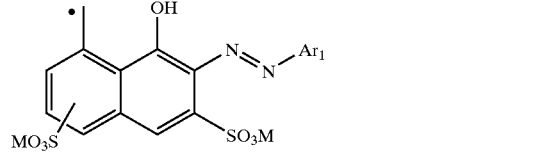

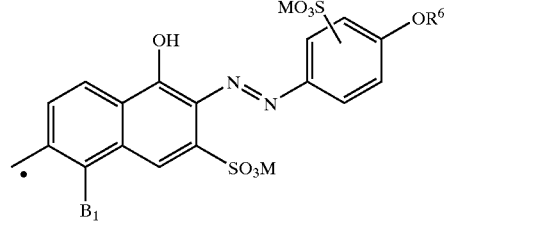

14 Claims, No Drawings

FIBRE REACTIVE SCARLET AZO DYES

The present invention relates to the field of fibre-reactive dyes.

Dyestuffs containing chromophores linked via a piperazine type linking unit are known from literature and are described for example in EP-A-0126265, EP-A-0693538 and WO99/05224.

The inventor of the present invention has surprisingly found that dyestuffs with a very strong and economic scarlet shade exhibiting excellent fastness properties can be obtained if piperazine type linking units are used to link two different chromophores each selected from a specific range of chromophores as defined below.

The present invention claims dyestuffs of the formula I

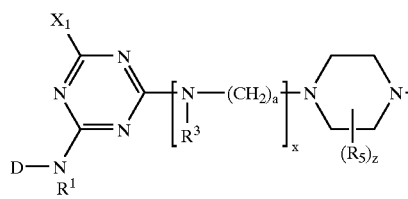
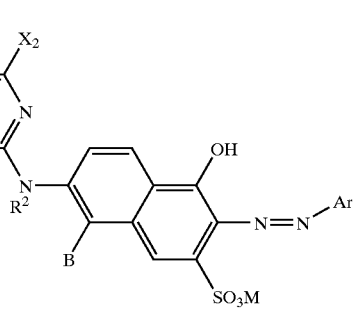
(I)

wherein each of $R^1$, $R^2$, $R^3$, $R^4$ and $R^5$, independently, is H or an optionally substituted alkyl group;

each of $X_1$ and $X_2$, independently, is a labile atom or group;

B is H or $SO_3M$;

M is H, an alkali metal, an ammonium ion or the equivalent of an alkaline earth metal;

Ar is a group of the formula II or of the formula III

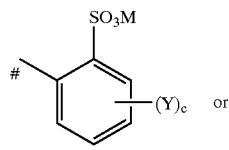
(II)

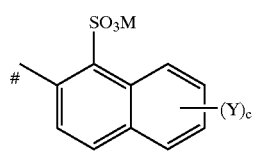
(III)

wherein

Y is $SO_3M$ or an alkyl group, c is 0, 1 or 2, M is defined as given above and # indicates the bond to the azo group in formula I;

D is a group of the formula IV

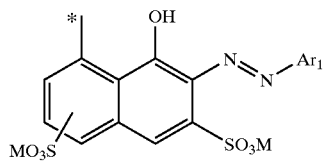
(IV)

wherein $Ar_1$ is defined as Ar, M is defined as given above and * indicates the bond to the $NR^1$ group of formula I; or D is a group of the formula V

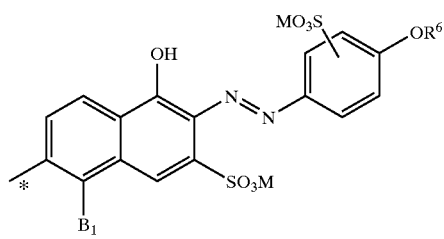
(V)

wherein $R^6$ is an alkyl group, $B_1$ is defined as B and M and * are defined as given above;

each of x and y, independently, is 0 or 1 and at least one of x and y is 1;

each of a and b is 2 to 5 and when each of x and y is 1, a>b; and z is 0, 1, 2, 3 or 4.

Alkyl groups may be straight-chain or branched and are preferably ($C_1$–$C_4$)-alkyl groups, for example methyl, ethyl, n-propyl, i-propyl or n-butyl. Substituted alkyl groups are preferably substituted by hydroxyl, ($C_1$–$C_4$)-alkoxy, halogen or carboxyl groups.

$R^1$ to $R^6$ are preferably H or methyl. $R^3$, $R^4$ and $R^5$ are especially preferably H.

$X_1$ and $X_2$ are preferably halogen like fluorine and chlorine and are especially preferably chlorine.

M is preferably H, an alkaline metal, like sodium, potassium and lithium and is especially preferably sodium.

D is preferably a group of the formula IVa

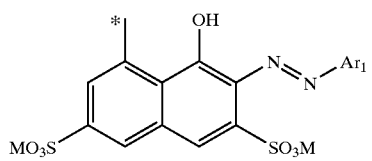
(IVa)

wherein M, Ar$_1$ and * are defined as given above. D is especially preferably a group of the formula IVa wherein Ar$_1$ is a group of the formula IIa or IIb

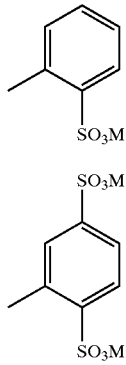

(IIa)

(IIb)

wherein M is defined as given above.

If D is a group of the formula IVa with Ar$_1$=a group of the formula IIa or IIb, R$^1$ is preferably H.

Ar is preferably a group of the formula IIIa

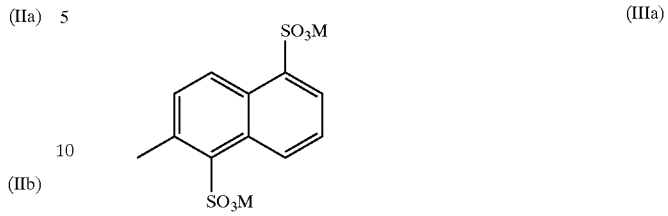

(IIIa)

wherein M is defined as given above.

If Ar is a group of the formula IIIa, R$^2$ is preferably H or methyl. If Ar is a group of the formula IIIa, R$^2$ and B are especially preferably H.

In preferred dyestuffs of the formula I x=1 and y=0 and a=2 or x=0 and y=1 and b=2.

Especially preferred dyestuffs of the formula I are the dyestuffs of the formula Ia

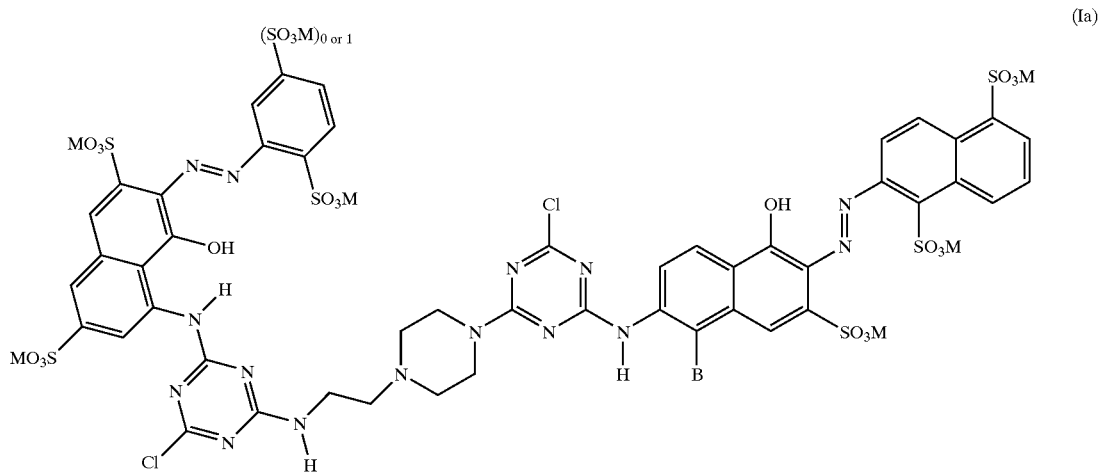

(Ia)

and of the formula Ib

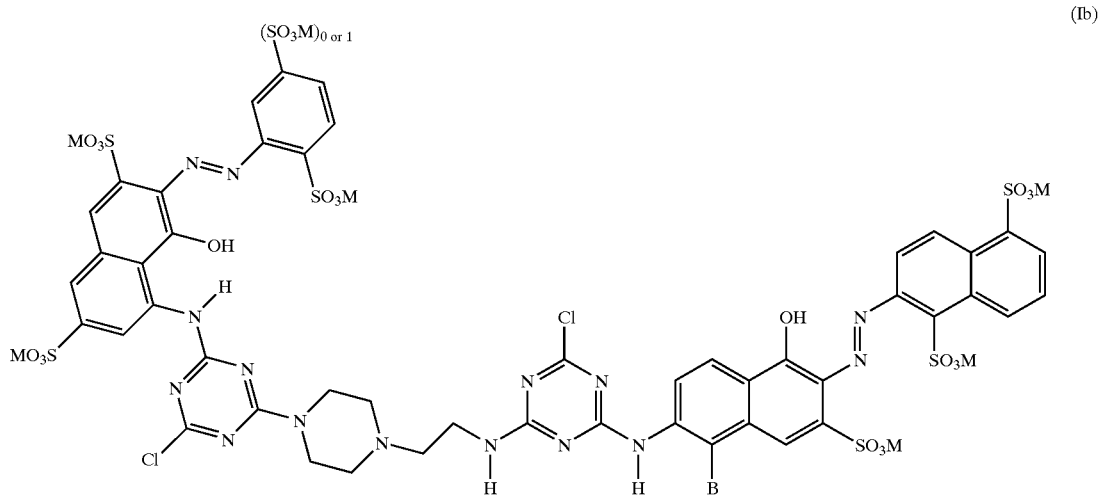

(Ib)

wherein B and M are defined as given above.

The dyestuffs of the present invention can be present as a preparation in solid or liquid (dissolved) form. In solid form they generally contain the electrolyte salts customary in the case of water-soluble and in particular fibre-reactive dyes, such as sodium chloride, potassium chloride and sodium sulfate, and also the auxiliaries customary in commercial dyes, such as buffer substances capable of establishing a pH in aqueous solution between 3 and 7, such as sodium acetate, sodium borate, sodium bicarbonate, sodium citrate, sodium dihydrogen-phosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dyestuffs of the present invention are present as dye powders containing 10 to 80% by weight, based on the dye powder or preparation, of a strength-standardizing colorless diluent electrolyte salt, such as those mentioned above. These dye powders may additionally include the aforementioned buffer substances in a total amount of up to 10%, based on the dye powder. If the dye mixtures of the present invention are present in aqueous solution, the total dye content of these aqueous solutions is up to about 50% by weight, for example between 5 and 50% by weight, and the electrolyte salt content of these aqueous solutions will preferably be below 10% by weight, based on the aqueous solutions. The aqueous solutions (liquid preparations) may include the aforementioned buffer substances in an amount which is generally up to 10% by weight, for example 0.1 to 10% by weight, preference being given to up to 4% by weight, especially 2 to 4% by weight.

A dyestuff of the formula I may for example be prepared by reacting a piperazine compound of the formula VI

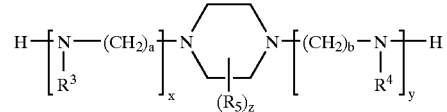

(VI)

wherin $R^3$, $R^4$, $R^5$, a, b, x, y, and z are defined as given above, with a compound of the formula VII

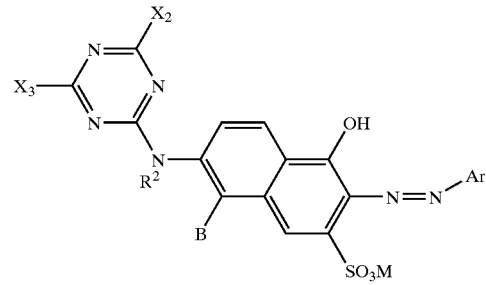

(VII)

wherein B, M, $R^2$, $X_2$ and Ar are defined as given above and $X_3$ is a labile atom or a group capable of reaction with an amine, preferably chlorine, and with a compound of the formula VIII

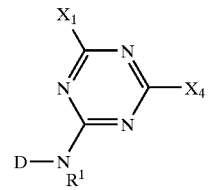

(VIII)

wherein D, $R^1$ and $X_1$ defined as given above and $X_4$ has one of the meanings of $X_3$.

It is possible to react a compound of formula VI first with a compound of the formula VII to form a compound of the formula IX

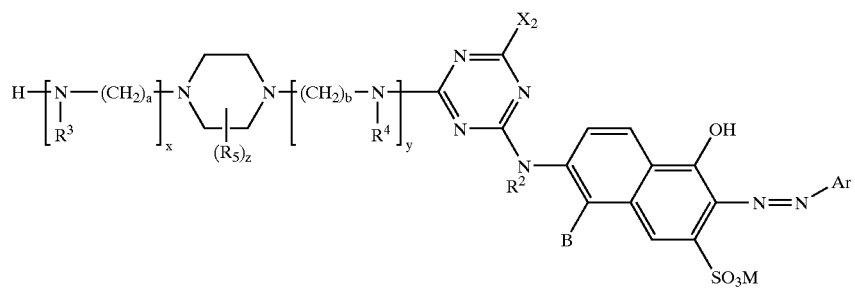

(IX)

wherein all variables are defined as given above,
which is then reacted with a compound of the formula VIII to a dyestuff of the formula I.

As an alternative is it also possible to react a compound of the formula VI first with a compound of the formula VIII to form the compound of the formula X

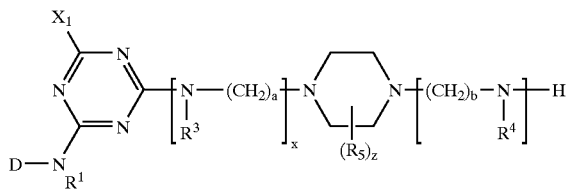

(X)

wherein all variables are defined as given above,
which is then reacted with a compound of the formula VII to a dyestuff of the formula I.

In general, one mole of a compound of the formula VI is reacted with 1 mole of a compound of the formula VII and 1 mole of a compound of the formula VIII in a manner known per se to a skilled person.

The compounds of the formulae VI, VII and VIII are known or can easily be prepared by a skilled person using methods which are known per se.

As an example, a compound of the formula VII, wherein $X_2$ is chlorine can be obtained by reacting cyanuric chloride with a compound of the formula XI

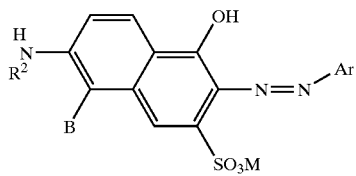

(XI)

wherein B, M, $R^2$ and Ar are defined as given above.

The compound of the formula XI can be prepared by means of customary diazotization and coupling reactions in a manner familiar to those skilled in the art using a diazotized amine of the formula XII Ar—NH₂ (XII)

and a coupling component of the formula XIII

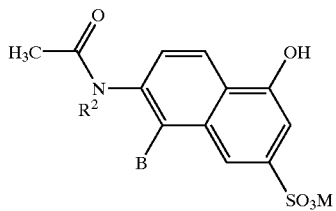

(XIII)

wherein Ar, B, M and $R^2$ are defined as given above and subsequently removing the acetyl group (—COCH₃) by saponification.

The dyestuffs of the instant invention are suitable for dyeing and printing hydroxy- and/or carboxamido-containing fibre materials by the application and fixing methods numerously described in the art for fibre-reactive dyes, in scarlet to mid-red shades with good aqueous solubility, color build-up, wash off and robustness to process variables. Moreover, the dyeings obtained surprisingly show very good light fastness properties.

The present invention therefore also provides for use of the inventive dyestuffs for dyeing and printing hydroxy- and/or carboxamido-containing fibre materials and processes for dyeing and printing such materials using a dyestuff according to the invention. Usually the dyestuff is applied to the substrate in dissolved form and fixed on the fibre by the action of an alkali or by heating or both.

Hydroxy-containing materials are natural or synthetic hydroxy-containing materials, for example cellulose fibre materials, including in the form of paper, or their regenerated products and polyvinyl alcohols. Cellulose fibre materials are preferably cotton but also other natural vegetable fibres, such as linen, hemp, jute and ramie fibres. Regenerated cellulose fibres are for example staple viscose and filament viscose.

Carboxamido-containing materials are for example synthetic and natural polyamides and polyurethanes, in particular in the form of fibres, for example wool and other animal hairs, silk, leather, nylon-6,6, nylon-6, nylon-11, and nylon-4.

Application of the inventive dyestuffs is by generally known processes for dyeing and printing fiber materials by the known application techniques for fibre-reactive dyes. The dyestuffs according to the invention are highly compatible with similar dyes designed for high temperature (80–100° C.) applications and are advantageously useful in exhaust dyeing processes.

Similarly, the conventional printing processes for cellulose fibres, which can either be carried out in single-phase, for example by printing with a print paste containing sodium bicarbonate or some other acid-binding agent and the colorant, and subsequent steaming at appropriate temperatures, or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

The inventive dyestuffs can in addition be used to produce inks useful for printing the substrates described above, for example textiles, especially cellulosic textiles, and paper. Such inks can be used in all technologies, for example conventional printing, ink-jet printing or bubble-jet printing (for information on such printing technologies see for example Text. Chem. Color, Volume 19(8), pages 23 ff and Volume 21, pages 27 ff).

Acid-binding agents responsible for fixing the dyes to cellulose fibres are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyestuffs according to the invention with the acid-binding agents with or without heating bonds the dyes chemically to the cellulose fibre. Especially the dyeings on cellulose, after they have been given the usual aftertreatment of rinsing to remove unfixed dye portions, show excellent properties.

The dyeings of polyurethane and polyamide fibres are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary levelling auxiliaries, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

EXAMPLE 1

1-(2-aminoethyl) piperazine (IVa) (1.3 g, 0.01 mol) was added dropwise to a stirred suspension of the orange dichlorotriazinyl dye (VIIa) (0.01 mol) in water (400 mls) at ambient temperature and pH6. The pH was then adjusted to 10 with sodium hydroxide solution and maintained at this pH for 30 minutes, yielding a slurry of the orange dye (IXa). To this suspension was added the red dichlorotriazinyl dye (VIIIa) (13.56 g, 0.01 mol) and the solution was maintained at pH 10 and ambient temperature overnight. The pH was adjusted to 6 with 2N HCl and the dye precipitated by the addition of methylated spirit. The precipitated dye was filtered off and dried to give the expected dye (Ia) (12.5 g). ($\lambda_{max}$=510 nm, $\epsilon$=76000, $\nu_{1/2}$=102 nm). Other analytical data were in full agreement with the expected structure.

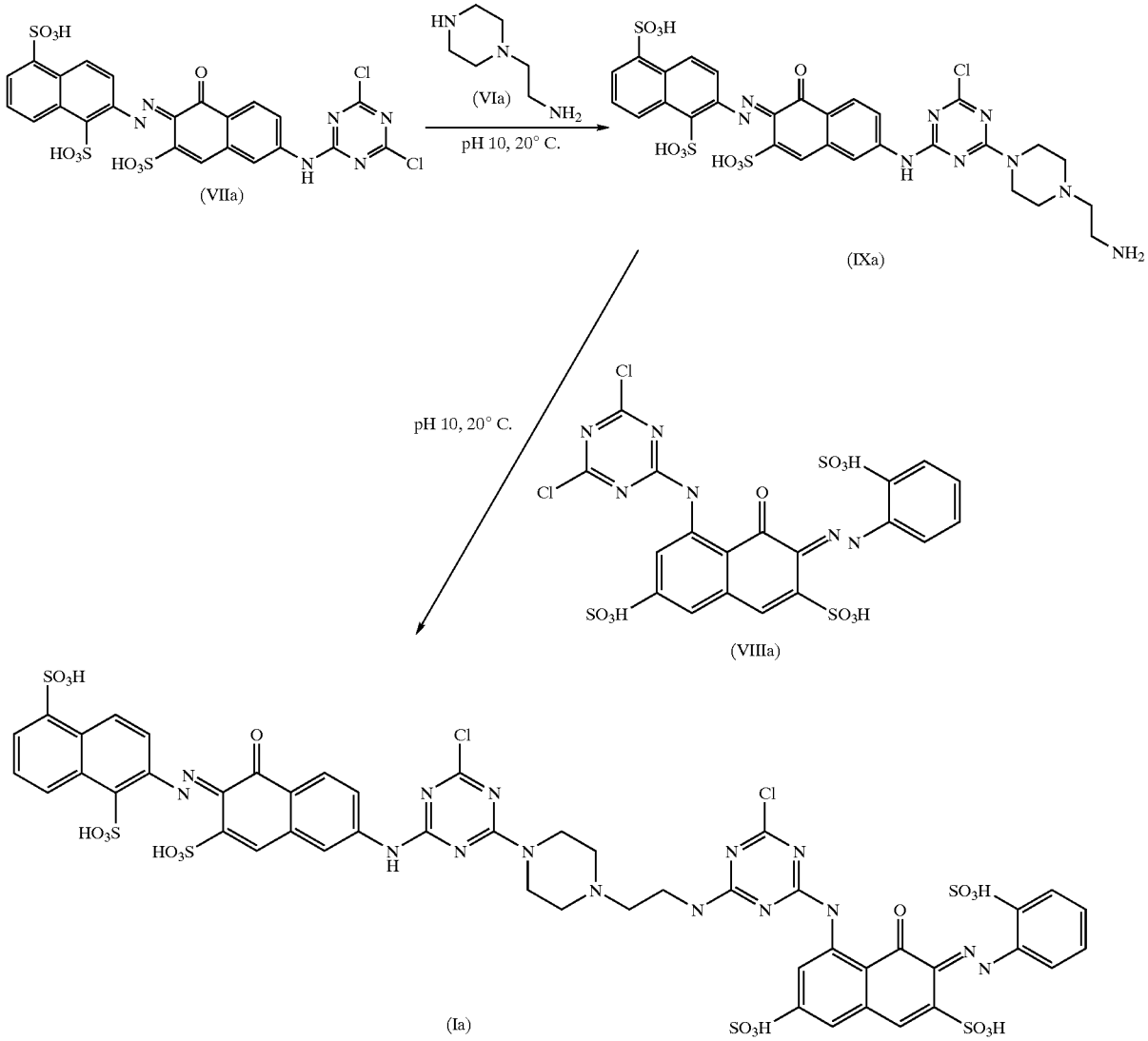

Following exactly analogous procedures the following dyes (examples 2–17) were synthesised.
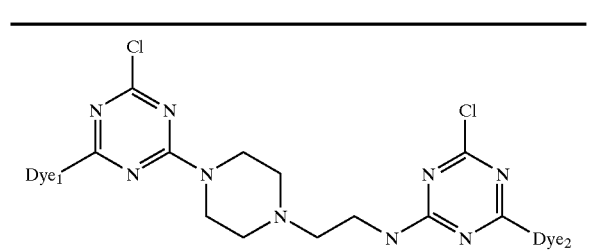
| Example | Dye 1 | Dye 2 | λmax/nm |
|---------|-------|-------|---------|
| 2 | e | d | 506 |
| 3 | h | d | 511 |
| 4 | e | a | 508 |
| 5 | c | e | 510 |
| 6 | a | f | 513 |
| 7 | c | f | 514 |
| 8 | a | g | 514 |
| 9 | e | b | 508 |
| 10 | b | f | 513 |
| 11 | a | h | 513 |
| 12 | c | h | 514 |
| 13 | b | h | 513 |
| 14 | h | b | 512 |
| 15 | b | e | 509 |
| 16 | i | a | 506 |
| 17 | a | i | 508 |
| 18 | c | j | 511 |
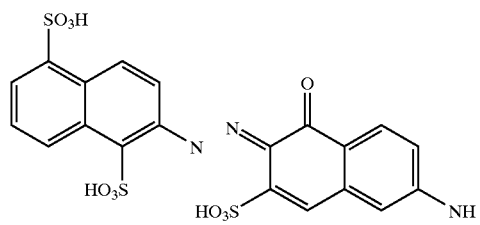
a
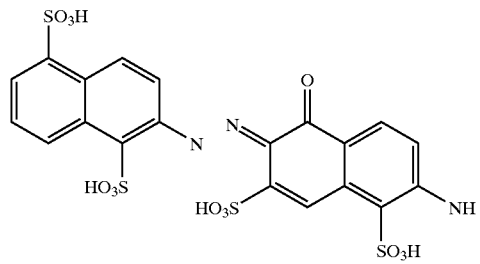
b
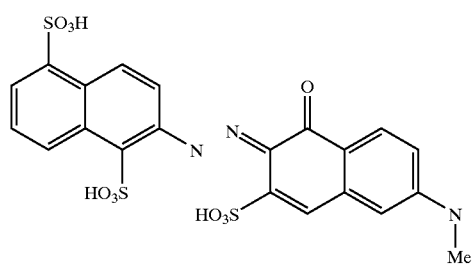
c
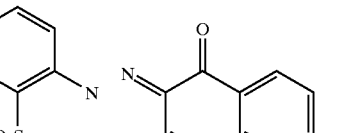
d
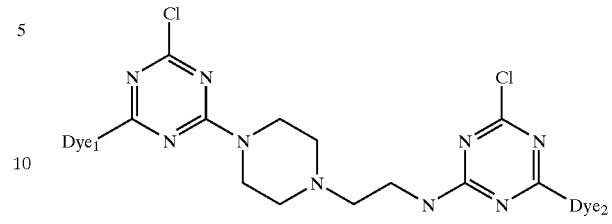
| Example | Dye 1 | Dye 2 | λmax/nm |
|---------|-------|-------|---------|
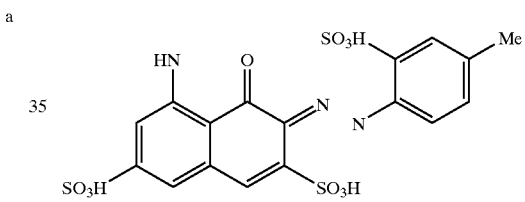
e
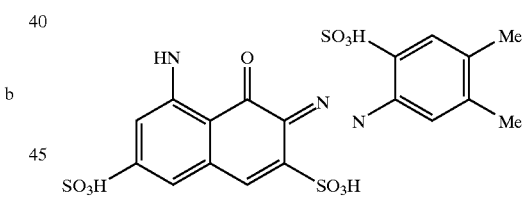
f
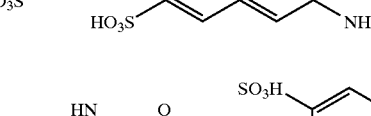
g
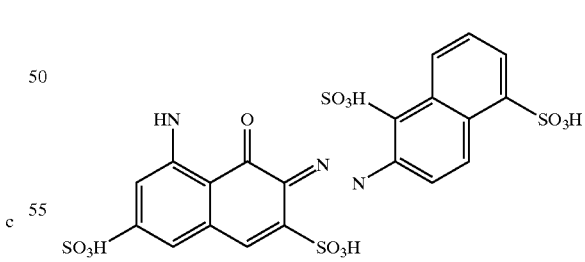
h
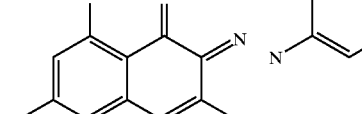
i
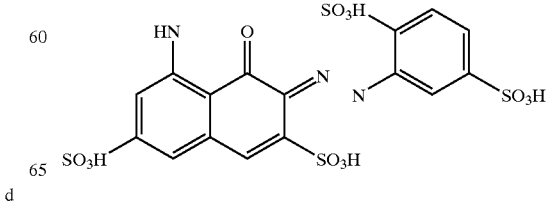
j -continued

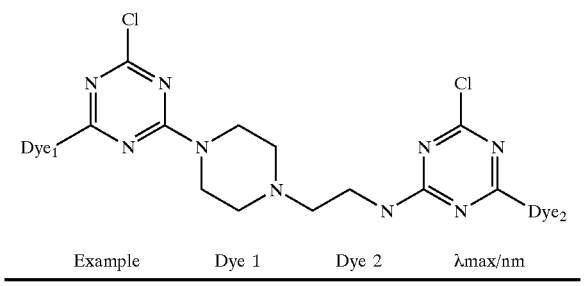

| Example | Dye 1 | Dye 2 | λmax/nm |

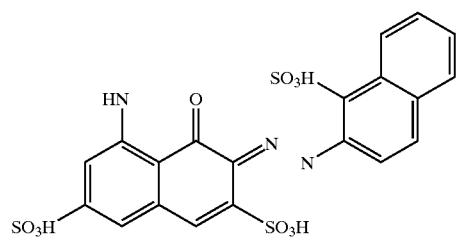

What is claimed is:

1. A dyestuff of the formula I

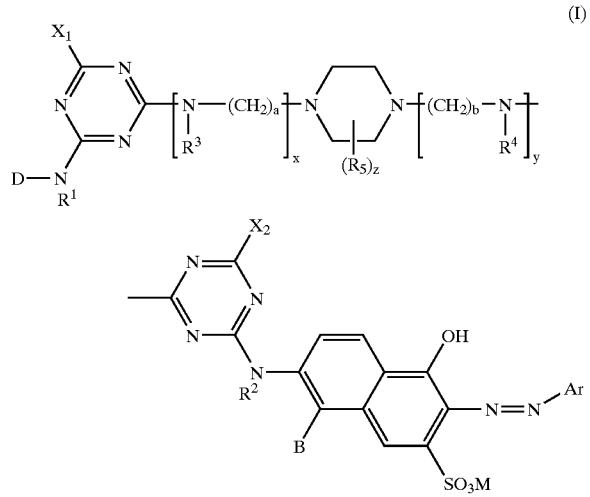

wherein each of $R^1$, $R^2$, $R^3$, $R^4$ and $R^5$, independently, is H or an optionally substituted alkyl group;

each of $X_1$ and $X_2$, independently, is a labile atom or group;

B is H or $SO_3M$;

M is H, an alkali metal, an ammonium ion or the equivalent of an alkaline earth metal;

Ar is a group of the formula II or of the formula III

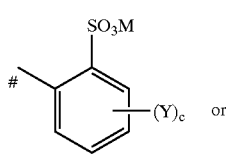 or

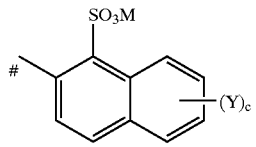

wherein

Y is $SO_3M$ or an alkyl group, c is 0, 1 or 2, M is defined as given above and # indicates the bond to the azo group in formula I;

D is a group of the formula IV

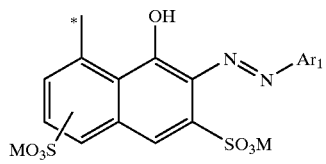

wherein $Ar_1$ is defined as Ar, M is defined as given above and * indicates the bond to the $NR^1$ group of formula I; or D is a group of the formula V

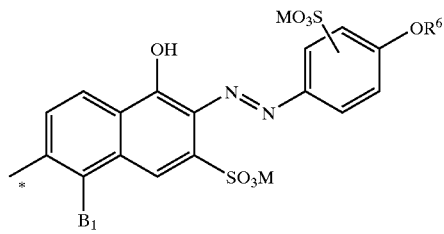

wherein $R^6$ is an alkyl group, $B_1$ is defined as B and M and * are defined as given above;

each of x and y, independently, is 0 or 1 and at least one of x and y is 1;

each of a and b is 2 to 5 and when each of x and y is 1, a>b; and z is 0, 1, 2, 3 or 4.

2. A dyestuff as claimed in claim 1, wherein $X_1$ and $X_2$ are halogen.

3. A dyestuff as claimed in claim 1, wherein M is H or an alkaline metal.

4. The dyestuff as claimed in claim 2, wherein M is hydrogen or sodium and $X_1$ and $X_2$ are chlorine.

5. The dyestuff as claimed in claim 4, wherein Ar is a group of the formula II or of the formula III

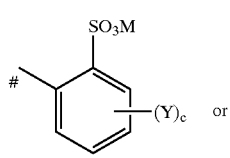 or

-continued

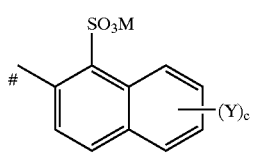
(III)

wherein

Y is SO₃M or an alkyl group, c is 0, 1 or 2,

M is H, or sodium; and # indicates the bond to the azo group in formula I.

6. The dyestuff as claimed in claim 1, wherein D is a group of the formula IVa

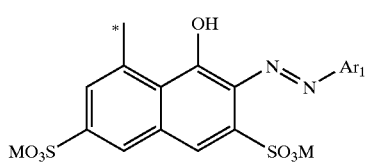
(IVa)

wherein M, Ar₁ and * are defined as given in claim 1.

7. The dyestuff as claimed in claim 5, wherein D is a group of the formula IVa

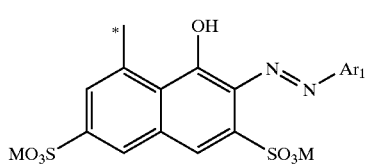
(IVa)

wherein

M is H or sodium;

Ar₁ is a group of the formula II or of the formula III

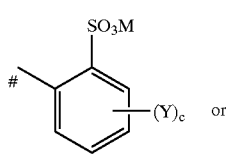
(II)

or

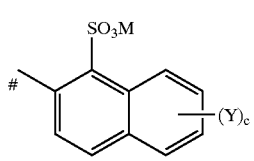
(III)

wherein

Y is SO₃M or an alkyl group, c is 0, 1 or 2, M is defined as given above and # indicates the bond to the azo group in formula I; and

* indicates the bond to the NR¹ group of formula I.

8. The dyestuff as claimed in claim 6, wherein Ar₁ is a group of the formula IIa or IIb

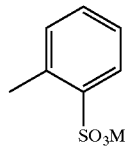
(IIa)

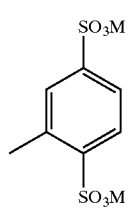
(IIb)

wherein M is H, an alkali metal, an ammonium ion or the equivalent of an alkaline earth metal.

9. The dyestuff as claimed in claim 7, wherein Ar₁ is a group of the formula IIa or IIb

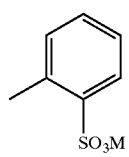
(IIa)

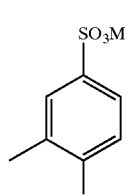
(IIb)

wherein M is H or sodium.

10. The dyestuff as claimed in claim 1, wherein the dyestuff of formula (I) is of the formula Ia

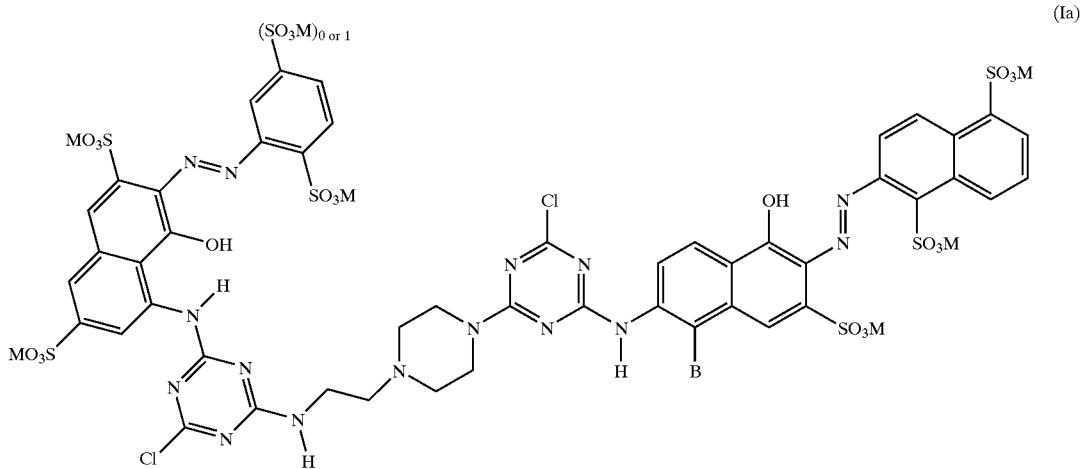

(Ia)

wherein B is H or SO₃M;

M is H, an alkali metal, an ammonium ion or the equivalent of an alkaline earth metal.

11. The dyestuff as claimed in claim 1, wherein the dyestuff of formula (I) is of the formula Ib

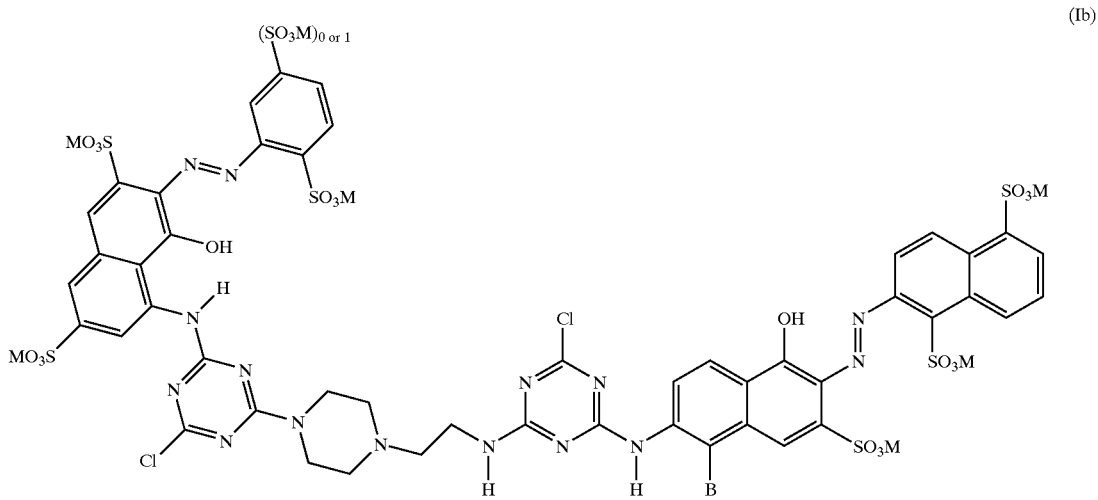

(Ib)

wherein B is H or SO₃M;

M is H, an alkali metal, an ammonium ion or the equivalent of an alkaline earth metal.

12. A process for preparing a dyestuff of formula I as claimed in claim 1, which comprises reacting a piperazine compound of the formula VI

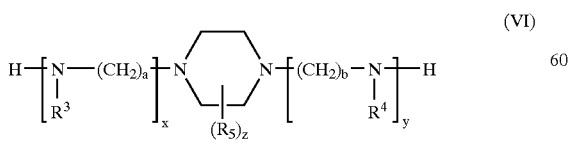

(VI)

wherein $R^3$, $R^4$, $R^5$, a, b, x, y, and z are defined as given in claim 1, with a compound of the formula VII

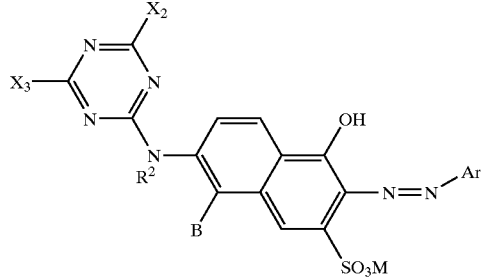

(VII)

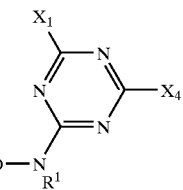

(VIII)

wherein B, M, $R^2$, $X_2$ and Ar are defined as given in claim 1 and $X_3$ is a labile atom or a group capable of reaction with an amine, and with a compound of the formula VIII wherein D, $R^1$ and $X_1$ defined as given in claim 1 and $X_4$ has one of the meanings of $x_3$.

13. The process as claimed in claim wherein $X_3$ is chlorine.

14. A process for dyeing and printing hydroxy-containing fiber material and/or carboxamido-containing fiber material which comprises contacting the fiber material with the dyestuff as claimed in claim 1.

* * * * *

UNITED STATES PATENT AND TRADEMARK OFFICE
CERTIFICATE OF CORRECTION

PATENT NO. : 6,946,549 B2
DATED : September 20, 2005
INVENTOR(S) : Warren J. Ebenezer It is certified that error appears in the above-identified patent and that said Letters Patent is hereby corrected as shown below:

Column 20,
Line 14, "13. The process as claimed in claim wherein $X_3$ is" should read -- 13. The process as claimed in claim 12 wherein $X_3$ is --.

Signed and Sealed this

Twenty-seventh Day of December, 2005

JON W. DUDAS
*Director of the United States Patent and Trademark Office*